Figure 6:
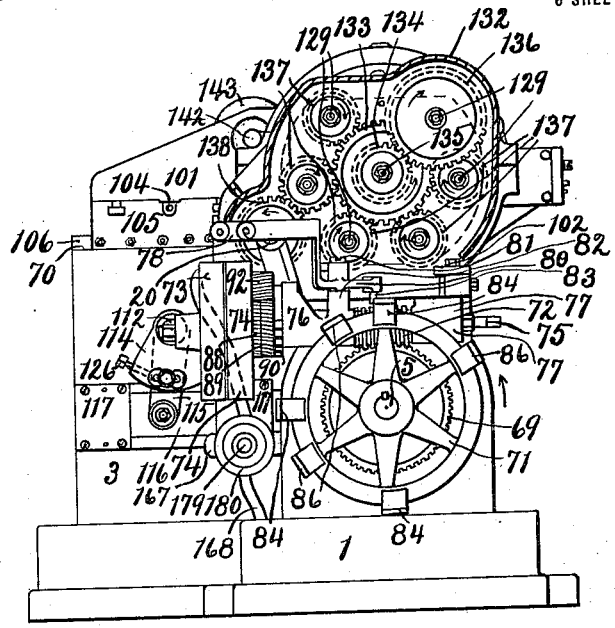

E. H. INGRAM.
GUN BARREL MACHINE.
APPLICATION FILED AUG. 14, 1917.
1,279,347.
Patented Sept. 17, 1918.
6 SHEETS—SHEET 1.
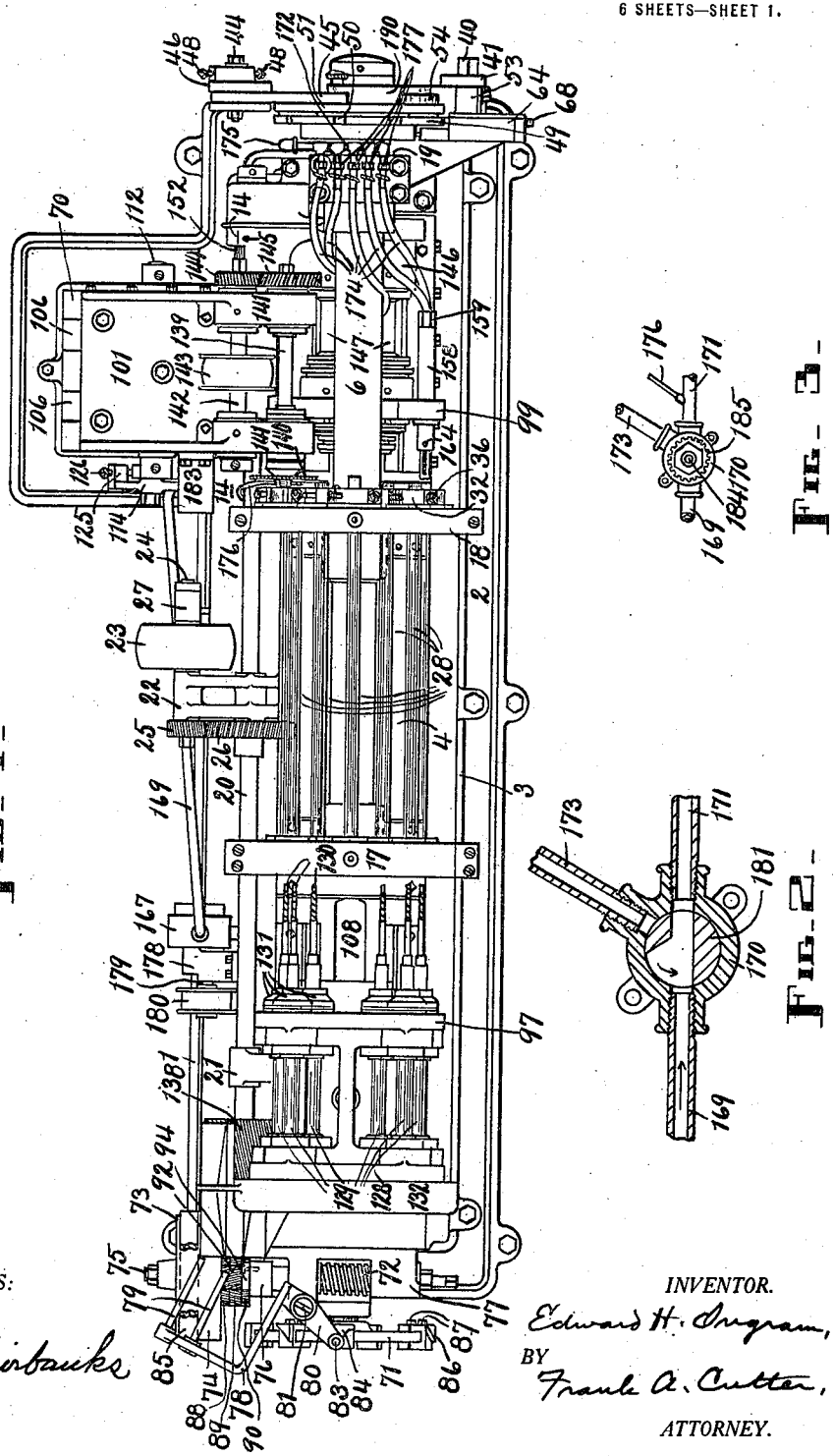
WITNESS:
A. C. Fairbanks
INVENTOR.
Edward H. Ingram,
BY
Frank A. Cutter,
ATTORNEY.

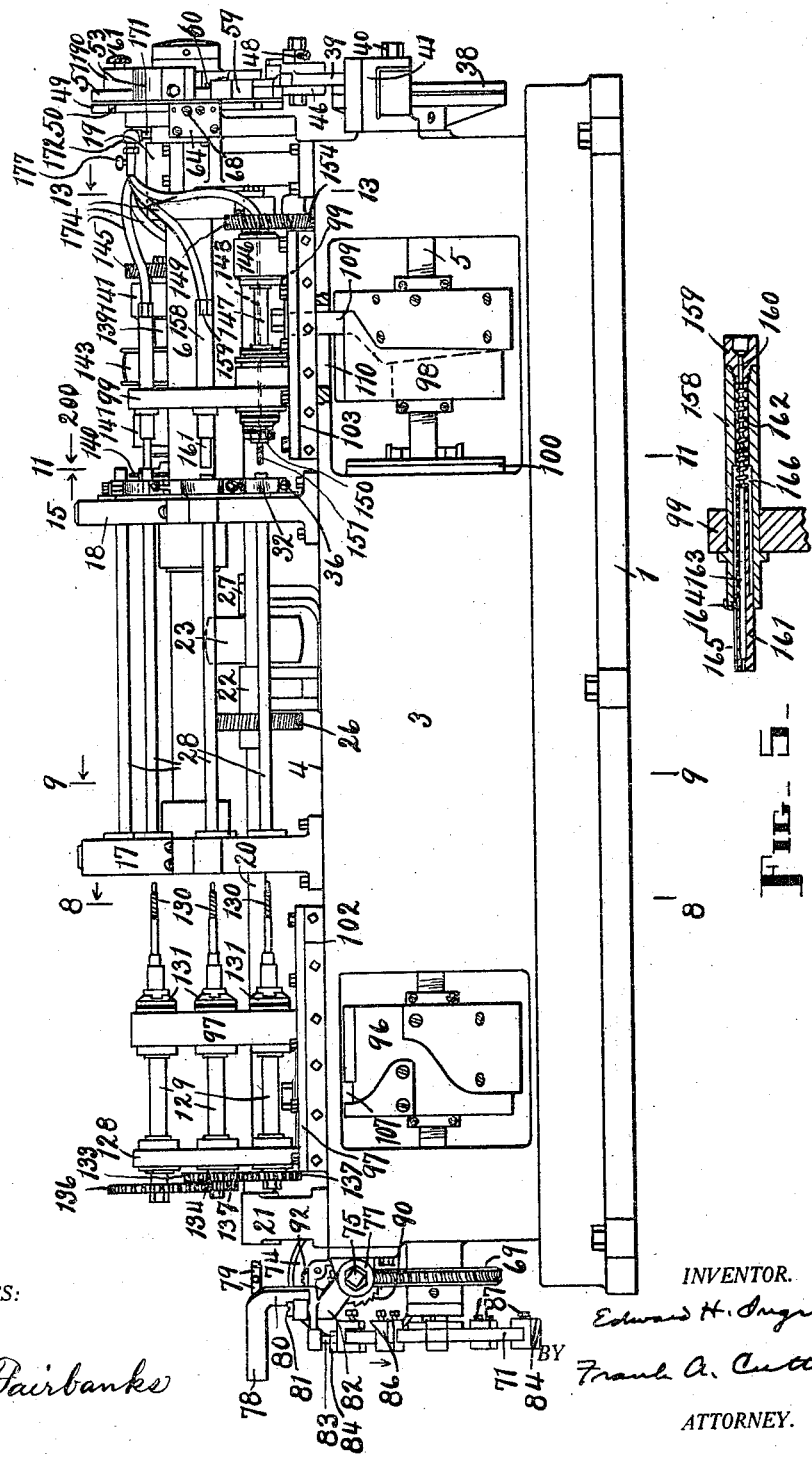

E. H. INGRAM.
GUN BARREL MACHINE.
APPLICATION FILED AUG. 14, 1917.

1,279,347.

Patented Sept. 17, 1918.
6 SHEETS—SHEET 3.

WITNESS:
A. C. Fairbanks

INVENTOR.
Edward H. Ingram,
BY Frank A. Cutter,
ATTORNEY.

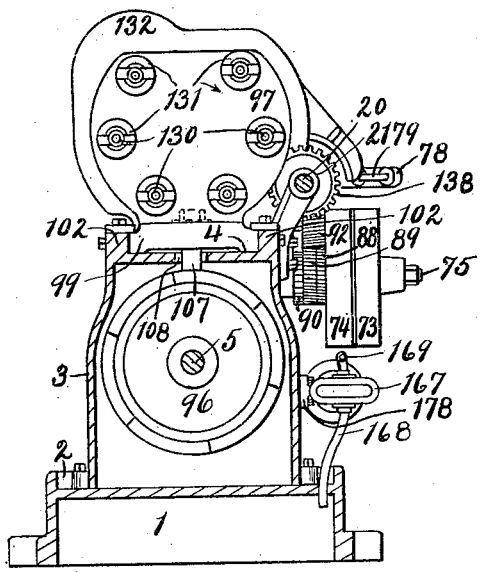
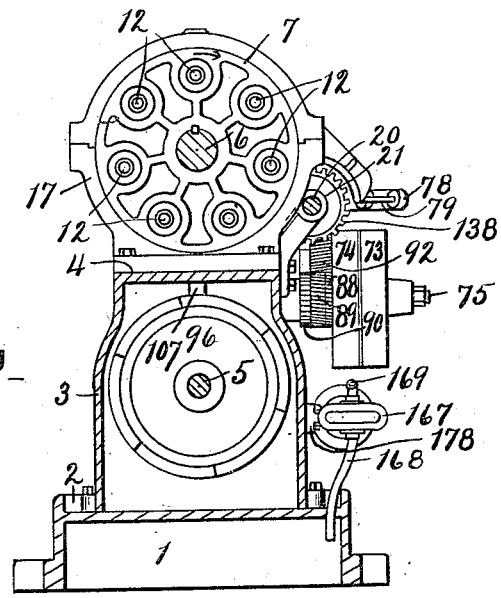

E. H. INGRAM.
GUN BARREL MACHINE.
APPLICATION FILED AUG. 14, 1917.

1,279,347.

Patented Sept. 17, 1918.
6 SHEETS—SHEET 5.

WITNESS:
A. C. Fairbanks

INVENTOR.
Edward H. Ingram,
BY
Frank A. Cutter,
ATTORNEY.

E. H. INGRAM.
GUN BARREL MACHINE.
APPLICATION FILED AUG. 14, 1917.
1,279,347.
Patented Sept. 17, 1918.
6 SHEETS—SHEET 6.
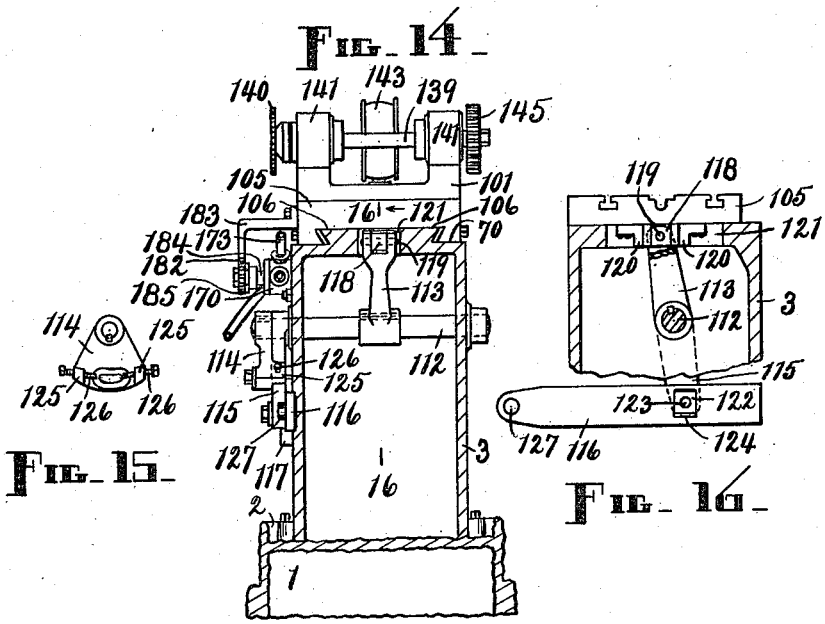
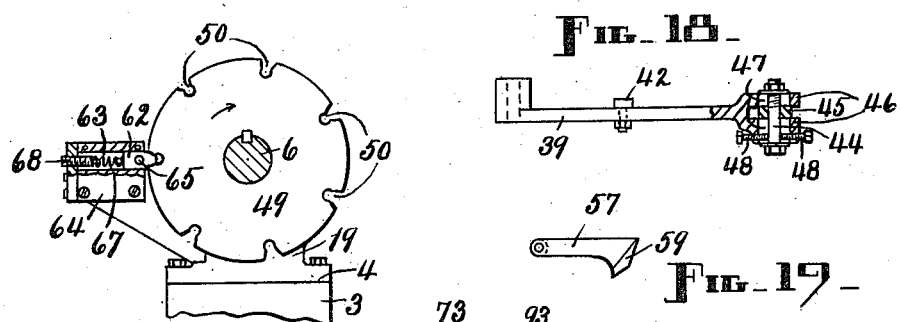
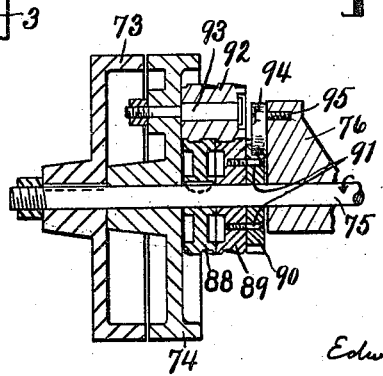
WITNESS:
A. C. Fairbanks
INVENTOR.
Edward H. Ingram,
BY
Frank A. Cutter,
ATTORNEY.

UNITED STATES PATENT OFFICE.

EDWARD H. INGRAM, OF SPRINGFIELD, MASSACHUSETTS.

GUN-BARREL MACHINE.

1,279,347.  Specification of Letters Patent.  Patented Sept. 17, 1918.

Application filed August 14, 1917. Serial No. 186,113.

*To all whom it may concern:*

Be it known that I, EDWARD H. INGRAM, a citizen of the United States of America, residing at Springfield, in the county of Hampden and State of Massachusetts, have invented a new and useful Gun-Barrel Machine, of which the following is a specification.

My invention relates to machines for chambering and cutting off gun barrels and finishing the muzzle ends of the same, and resides in certain peculiar means and mechanisms for progressively boring out the chambers in gun barrels and at the same time progressively cutting off the barrels at the muzzle ends and finishing such ends. This machine includes intermittently-operated, rotary means for carrying the gun barrels, which includes so-called indexing mechanism, means to rotate and means to reciprocate the chambering-and muzzle-finishing-tool holders, means to rotate and advance and retract the saw, an oil system, and necessary or desired adjustments, together with such other means and mechanisms, or auxiliary and subsidiary parts and members, as may be required to render said machine complete and serviceable in every particular, all as hereinafter set forth.

The primary object of my invention is to produce a machine for automatically, expeditiously, and accurately chambering the breech ends of gun barrels, cutting such barrels to the proper length, and rounding and finishing such barrels at their muzzle ends.

A further object is to make provision, in such a machine, for changing the gun barrels while the machine is in operation.

Another object is to provide an adequate oil supply for the tools which operate on both ends of the gun barrels, and to utilize the oil, by forcing it through said barrels, to remove from the barrels the chips cut therefrom by said tools.

A gun barrel can be chambered, cut to length, and have the muzzle finished, all complete, in one and one-half (1½) minutes, in this machine.

Other objects and advantages will appear in the course of the following description.

A preferred embodiment of the invention, whereby I attain the objects and secure the advantages of the same, is illustrated in the accompanying drawings, and I will proceed to describe said invention with reference to said drawings, although it is to be understood that the form, construction, arrangement, etc., of the parts may be modified without departure from the scope of the invention as defined by the appended claims.

Figure 7:
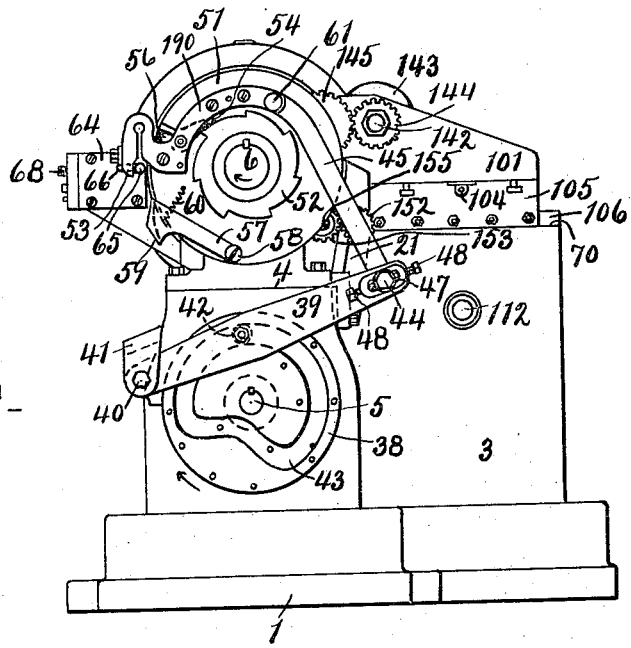
Figure 10:
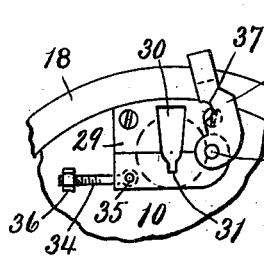
Figure 11:
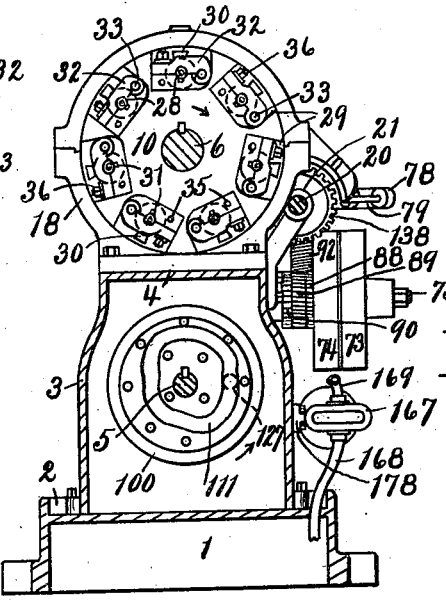
Figures 12, 13:
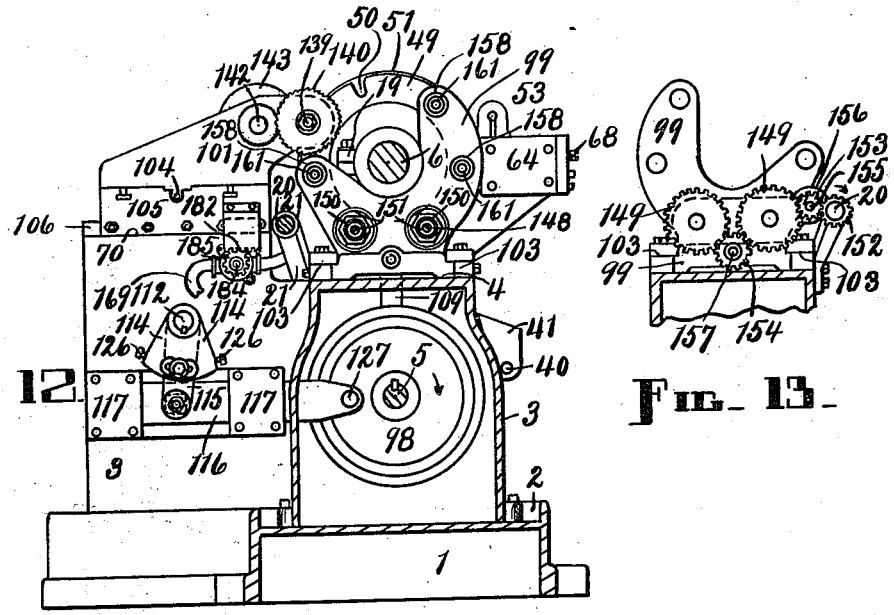

In the drawings, in which like reference characters designate like parts throughout the several views, Figure 1 is a top plan of a machine which embodies my invention as aforesaid; Fig. 2, an enlarged, sectional detail of the automatic oil valve; Fig. 3, a slightly enlarged detail in side elevation of parts of the oil-supplying and -controlling elements; Fig. 4, a front elevation of said machine, the housing for the gears which drive the reamers being omitted; Fig. 5, an enlarged, central longitudinal section through one of the oil-duct units which connects with gun barrels and supplies oil thereto and to the tools; Fig. 6, a left-hand, end elevation of the machine, said housing being in section; Fig. 7, a right-hand, end elevation of the machine; Fig. 8, a transverse, vertical section through the machine, taken on lines 8—8, looking in the direction of the associated arrow, in Fig. 4; Fig. 9, a similar section, on lines 9—9, looking in the direction of the associated arrow, Fig. 4; Fig. 10, an enlarged detail of one of the gun-barrel locks; Fig. 11, a transverse, vertical section through the machine, on lines 11—11, looking in the direction of arrow 200, Fig. 4; Fig. 12, a similar section on the same lines, but looking in the direction of arrow 15; Fig. 13, a sectional detail taken on lines 13—13, looking in the direction of the associated arrow, Fig. 4; Fig. 14, a detail of the saw head and operating mechanism therefor and associated therewith, such detail being a section taken on lines 14—14, looking in the direction of the associated arrow, in Fig. 1; Fig. 15, an elevation of the inner side of the adjustment segment of the aforesaid mechanism; Fig. 16, a section detail on lines 16—16, looking in the direction of the associated arrow, Fig. 14; Fig. 17, a detail, in elevation and partial section, of the locking elements of the indexing mechanism; Fig. 18, a top plan and partial section of the cam-operated lever of said indexing mechanism; Fig. 19, an elevation of the inner side of the bolt-actuating lever, finger, or dog of the said mechanism, and Fig. 20, an enlarged sectional detail of the tight and loose pulleys and differential for the mechanism which reciprocates the chambering and combined muzzle-finishing and oiler heads.

Referring to the drawings it will be seen that this is a turret machine which has seven stations. The turret is intermittently operated, to carry the gun barrels therein progressively from roughing position, through various intermediate positions, to finishing position, starting at loading position and ending at said last-named position.

The machine includes three working heads, one for the tools or reamers for chambering the barrels at their breeches, another for a saw with which to cut the barrels to length, and still another for the rounding-off tools for the muzzles of the barrels. These are all sliding heads.

The chambering or reaming head is adjacent to the left-hand end of the machine, and carries the six tools required to finish the barrel chambers; and mechanism is provided to advance and retract said head three times, more or less forcing said tools into said chambers farther each time until at the last stroke the inner ends of the chambers are reached, after the turret has indexed by being given one-seventh of a revolution, or between each two sequential partial revolutions of said turret. By thus advancing the tools a certain distance, taking off a proportionate part of the stock, and then retracting said tools, an operation which is repeated, the chips are removed and so prevented from clogging and roughening or injuring the chambers. The reamers are advanced farther into the chambers the second time than the first, and farther the third time than the second, to the full extent the third or last time, in fact, as before stated.

The muzzle-finishing head is adjacent to the right-hand end of the machine, and carries the two tools required to round and finish the barrel muzzle, one being a roughing tool and the other a finishing tool.

The turret is between the chambering or reaming head and the muzzle-finishing head.

The cutting-off head is at right-angles to the axis of the turret, which axis, continued at both ends, coincides with the axis of the cambering and muzzle-finishing heads, and in position to locate its saw in a vertical plane just to the right of the right-hand end of said turret.

The muzzle-finishing head is a part of the oil system, and might be termed an oiler head as well as a muzzle-finishing head, or as it is herein termed a combined muzzle-finishing and oiler head.

The oil is shut off automatically, while the machine is indexing, thus preventing disagreeable splashing, and let on again automatically after the indexing has taken place and when the tools begin once more to perform their cutting operations.

The automatic, speed-controlling mechanism provided particularly for the reaming head and to gain time when indexing is at the left-hand end of the machine, and the automatic, indexing mechanism for the turret at the opposite end of the machine.

The machine is driven from three different or independent, direct sources of power, or at three separate points. In addition to these drives there may be an oil-pump drive. Then there are the several driving mechanisms in the machine for the spindles, saw, etc.

The turret has seven stations in order that there may be the loading or receiving station to which reference has previously been made. The other six stations correspond with the six reamers, at one end of the turret, and with the cut-off (saw) and five oil-supply members, with two of which latter are combined or connected the two muzzle-finishing tools, at the other end of said turret.

The arrows associated with rotary members indicate the directions of rotation of such members.

The machine as here represented has a base 1 in which is a channel 2 to receive the used oil, chips, etc., and a partially closed-in bed or frame 3. These members carry and support the several operating parts and mechanisms.

It is to be understood that the base and bed members and other fixed parts and members are bolted to the floor and to each other substantially as shown, or in any usual and customary manner.

In plan the base 1 and bed or frame 3 are rectangular with a rectangular rearward projection adjacent to the right-hand end of the main portions of said base and frame. The top of the aforesaid projection is higher than the top of the major portion of the frame 3 and I will designate the latter as the table 4 and the former as the table 70.

A cam shaft 5 is journaled under the table 4 in the longer portion of the frame 3 and projects beyond each end thereof. A turret shaft 6 is provided with two disks or heads 7 and 10 and is mounted above the table 4 and directly over the shaft 5, said heads being journaled in annular supports or bearings 17 and 18, respectively, on said table, and said turret shaft at the right-hand terminal being journaled in and projecting beyond a bearing 19 on the corresponding end of said table. A tool-driving shaft 20, parallel with the shafts 5 and 6, is journaled above the plane of the table 4 and a little back of the rear edge of said table, in bearings afforded by bearing brackets 21 and 22. The right-hand, terminal portion of the shaft 20 passes in front of the table 70.

The shaft 20 is driven by a belt (not shown) applied to a pulley 23 secured to a shaft 24, and intermeshing spiral members, such as a spiral pinion 25 secured to said shaft 24 and a spiral gear 26 secured to said shaft 20. The shaft 24 is journaled with the shaft 20 in the bearing bracket 22 and in a lateral arm 27 of said bracket.

The turret head 7, which revolves in the left-hand support or bearing 17, is keyed to the shaft 6, and has seven openings 12 therein for the same number of gun barrels 28, the axes of such openings being equi-distant apart in a circle which is concentric with said bearing and head, as clearly shown in Fig. 9. The breech ends of the barrels 28 are received in the openings 12, the sides of which latter being properly formed, flanged in this case, to receive such ends.

The turret head 10, which revolves in the right-hand support or bearing 18, is also keyed to the shaft 6, and has secured to the right-hand face thereof seven plates 29. In the head 10 and extending through the plates 29 are the same number of openings 30 as are in the head 7, and such openings are arranged and spaced in said head 10 in the same way as are the openings 12 in said head 7—see more particularly Figs. 10 and 11. The major axial center of each opening 30 is radial to the center of the head 10. The openings 30 are designed to receive the muzzle ends of the gun barrels 28, with their sights in extensions 31 at the inner ends of said openings, and must be of sufficient length to permit said ends of said barrels to be introduced therein after the breech ends of said barrels have been inserted in the openings 12.

The gun barrels 28 must be held securely in place in the turret, and to this end the head 10 is provided with a clamp for each barrel. Such clamp comprises, with one of the plates 29, a latch 32 having one end pivoted at 33 to said plate, a bolt 34 having one end pivoted at 35 to said plate, and a nut 36 on said bolt, the construction and arrangement of parts being such that said latch can be closed on the protruding muzzle end of a gun barrel, and secured by means of said bolt and nut. In securing the latch 32 after it has been closed on the gun barrel, the bolt 34 is swung into engagement with the free terminal of said latch, which terminal is bifurcated to receive said bolt, and the nut 36 is screwed tightly against said latch terminal. The release of the latches 32 is effected by loosening the nuts 36 and disengaging the bolts 34 from said latches, when the latter can be swung out of engaging position with the gun barrels. Each latch 32 has a recess 37 therein which is adapted to fit a barrel in the inner end of the adjacent opening 30. The axes of the practically complete circular openings formed by the inner ends of the openings 30 and the recesses 37, when the latches 32 are in closed position, are in line with the axes of the openings 12. In Fig. 11 the latches 32 are represented as being closed and locked by the bolts 34 and nuts 36, as would be the case were the gun barrels 28, shown in Figs. 1 and 4 only, present in said first-named view.

Those parts of the heads 7 and 10 which contain a pair of alining openings 12 and 30 are assumed to constitute a gun-barrel station, and each barrel 28 is entered and clamped in position at the station which is uppermost at the time, and unclamped and removed when such station again becomes uppermost.

The turret is intermittently rotated, making one-seventh of a revolution each time it is operated, so as to advance each station and the barrel 28 therein the distance between two adjacent stations. This action or movement of the turret is termed indexing, and the mechanism by which such indexing is done will next be described, special reference being had to Figs. 7, 17, 18 and 19.

Secured on the protruding right-hand terminal of the shaft 5 is a grooved cam 38. A lever 39 has its front terminal pivoted at 40 to a bracket 41 secured to the right-hand end of the frame 3, and is provided with a follower 42 which is received in the groove 43 of the cam 38, and has its rear terminal pivotally connected at 44 with the base of an operating lever 45. The lever 39 is forked at 46 to receive the lever 45, and slotted at 47 and provided with bolts 48—48 respectively to receive and afford adjustment for the pivot 44. Secured on the shaft 6 at the right of the bearing 19 is a disk or lock-plate 49 having seven equi-distant notches 50 in the periphery thereof; loosely mounted on said shaft at the right of said plate is a disk 51, and secured on said shaft at the right of said last-named disk is a ratchet-wheel 52 having seven teeth. There is a curved bridge-piece 190 bolted to the outer face of the loose disk 51, and the lever 45 is pivotally attached at 61 to said bridge-piece and disk. The bridge-piece 190 has a latch-head 53 at the front end. A pawl 54, for the ratchet-wheel 52, is let into and pivoted at 55 to the bridge-piece 190, being let into the same from the inner side, and a spring 56 is arranged between said bridge-piece or the latch-head 53 and a projecting part of said pawl to press the latter into engagement with the teeth of said ratchet-wheel at all times. The curved part of the bridge-piece 190 is above the ratchet-wheel 52, and the latch-head 53 is in front of the upper portion of said ratchet-wheel. The lever 45 extends downwardly and rearwardly behind the ratchet-wheel 52 to the lever 39. A movable dog 57 is pivoted at 58 to the outer face of the disk 51, and extends forward from the pivoted point beyond the periphery of said disk. The dog 57 is provided at the free end on the inside with a lug 59, which lug extends in front of the periphery of the disk 51. A spring 60 is arranged normally to retain the dog 57 with the lug 59 in contact with the aforesaid periphery. A latch or bolt 62 is provided for the lock-plate 49, such bolt being designed to engage in any one of the notches 50. The bolt 62 is arranged to slide in a horizontal passage 63 located directly in front of the horizontal diameter of the lock-plate 49 in a bracket 64. The bracket 64 is supported from the bearing 19. A pin 65 projects to the right from the bolt 62, through a slot 66 in the right side wall of the passage 63, in front of the periphery of the disk 51 and into the fields of operation of both the latch-head 53 and the lug 59 of the dog 57. A spring 67 is arranged in the passage 63, between the inner end of the bolt 62 and the inner end of an adjusting screw 68 to regulate the tension of said spring, and said spring tends to force said bolt into contact with the periphery of the lock-plate 49 or into one or another of the notches 50.

The major portion of the cam groove 43 is concentric with the annular periphery of the cam 38, and the remaining portion of such groove has an inward projection toward the shaft 5. While the follower 42 is in the aforesaid concentric portion of the groove 43, the lever 39 so positions the lever 45 that the latch-head 53 engages the pin 65 and prevents the latch 62 from being withdrawn from or working out of the notch 50 in which the nose of said latch during such time is entered, and the dog 57 is remote from said pin. The lock-plate 49 being thus held against rotation by the bolt 62, in turn holds the shaft 6 with the turret against rotation. When, however, the follower 42 enters the deeper portion of the groove 43, the lever 39 is actuated downwardly, swinging on its pivot 40, and draws down the lever 45, with the result that the disk 51 is partially rotated, the head 53 is raised out of the path of the pin 65, the lug 59 on the dog 57 is actuated into engagement with said pin and forces the same forwardly, thus withdrawing the bolt 62, against the resiliency of the spring 67, from the notch 50 engaged thereby, and releasing the lock-plate 49, and the pawl 54 actuates the ratchet-wheel 52, causing the latter to make a partial rotation equal to the distance between two adjacent ratchet-wheel teeth or to one-seventh of a revolution. Since the ratchet-wheel 52 is secured to the shaft 6, said shaft and the turret are caused to make the one-seventh of a revolution with said ratchet-wheel, and the lock-plate 49 being secured to said shaft is also caused to make one-seventh of a revolution and to present the next succeeding notch 50, in the direction of rotation of said plate, to the bolt 62 when next said bolt is released. And when the follower 42 leaves the deeper portion of the groove 43, or while said follower is riding out from such portion into the concentric portion, the lever 39 is swung upwardly on its pivot, and forces upward the lever 45, with the result that the disk 51 is rocked back to its former position, the head 53 is closed over the pin 65, the lug 59 is carried downwardly away from said pin, and the pawl 54 is carried forwardly and downwardly into position to engage the next succeeding ratchet-wheel tooth in the reverse direction to that of rotation of the ratchet-wheel 52. The lug 59 in the first instance engages with its front edge the pin 65, and such lug is carried up until said edge clears said pin and in so doing releases the bolt 62 to the spring 67. The bolt 62 is then forced against the periphery of the lock-plate 49 and enters the next notch in the direction of rotation of said plate, at the end of the partial rotation imparted to the parts by the pawl 54, thus relocking said plate and the other members, and presenting the pin 65 in position to be reëngaged by the head 53. The lug 59 in the second instance passes down with its inside edge on the outside of the pin 65, and the spring 60 yields to permit said lug to ride over and clear said pin and pass down into initial position again. The lever 45 oscillates on the pivot 61 during the action of said lever and of the disk 51.

At each revolution of the shaft 5, therefore, the turret is caused to make one-seventh of a revolution and to advance each of the barrels 28 one station.

Secured on the protruding left-hand end of the shaft 5 are a worm gear 69 and a cam-wheel 71, the former inside of the latter. The worm-gear 69 and cam-wheel 71 constitute members of the varying-speed drive for the shaft 5. The other members of said drive include a worm 72 which intermeshes with the worm-gear 69, tight and loose pulleys 73 and 74, respectively, and a differential, said worm, pulleys, and certain of the differential members being on a shaft 75 which is journaled above and at right-angles to the shaft 5, in bearings 76 and 77 projecting from the left-hand end of the frame 3, and a belt shipper 78. The shipper 78 has two rods 79 which extend into position over the pulleys 73 and 74 to receive between them and shift from one pulley to the other, as said shipper is actuated, a belt, represented at 85 in Fig. 1, which drives said pulleys, and said shipper also has a downwardly- and forwardly-projecting arm 80 which is pivotally mounted at 81 on a post 82 rising from the bearing 76, and provided at its front end with a downwardly-extending pin 83. On the periphery of the cam-wheel 69 are three dogs or cams 84 and three dogs or cams 86 alternately arranged, and the pin 83 is in the path of said cams. The working surfaces of the cams 84 and 86 are obliquely arranged relative to the vertical planes of the cam-wheels 9, and those on adjacent cams are oppositely directed, so that, as the cam-wheel 71 revolves and said cams encounter the pin 83, the shipper 78 is actuated on the pivot 81 in alternate directions and shifts the belt 85 from one pulley to the other and back again indefinitely. The cams 84 actuate the pin 83 and pin-supporting end of the arm 80 inwardly and so cause the belt 85 to be shifted from the pulley 73 onto the pulley 74, and the cams 86 actuate said pin and said end of the arm outwardly and so cause said belt to be shifted from said pulley 74 onto said pulley 73. The cams 84 and 86 are fastened to the cam-wheel 69 by means of bolts 87, and upon loosening such bolts said cams can be adjusted to any desired extent on the periphery of said wheel. The pulleys 73 and 74 drive the shaft at different speeds, and the speed changes are governed by the cams 84 and 86, as will presently appear, consequently any change in the positions of said cams on the cam-wheel 69 affects correspondingly the speed changes relative to time, as will be clearly seen from the subsequent description.

The pulley 73 drives the worm-shaft 75 much faster than does the pulley 74, because said first pulley is keyed directly to said shaft, while said second pulley is loose on said shaft and drives the same through the medium of a differential which I will now explain, but only briefly inasmuch as such differential is of a well-known type. Spiral-gears 88 and 89 and a ratchet-wheel 90 are mounted on the shaft 75 between the pulley 74 and the bearing 76, the spiral-gear 88 being next to said pulley and keyed to said shaft, and said ratchet-wheel being next to said bearing and with the spiral-gear 89 loose on said shaft. The spiral-gear 89 is between the companion spiral-gear and the ratchet-wheel, and said spiral-gear 89 and ratchet-wheel are secured to each other by screws 91 or other suitable means. A spiral-gear 92 is loosely mounted on a stud 93 which extends forward from the pulley 74 in position to enable said spiral-gear to intermesh with both spiral-gears 88 and 89, the first-named gear being of sufficient length for that purpose. The spiral-gear 88 has one more tooth than does the spiral-gear 89, there being in this instance forty teeth on said first-named gear and thirty-nine teeth on said second-named gear. A pawl 94 is pivoted at 95 to the back side of the bearing 76 in position to engage the ratchet-wheel 90 and hold the same with the spiral-gear 89 against backward movement.

When the pulley 74 is rotated, the spiral-gear 92 is carried around with said pulley, and said spiral-gear in circling the spiral-gears 88 and 89 each time causes said gear 88 to make one-fortieth of a revolution, owing to the fact that the pawl 94 holds the ratchet-wheel 90 with said gear 89 against backward rotation. Thus the shaft 75 is driven very slowly by the pulley 74.

The differential offers no material resistance to the action of the shaft 75 when driven by the pulley 73, as will be clearly understood.

Besides the cam 38 on the shaft 5 there are three other cams on said shaft. There is a cam 96 for a reciprocable, chambering-tool or reamer head 97 which is on the table 4 at the left of the turret, a cam 98 for a reciprocable, combined muzzle-finishing-tool and oiler head 99 which is on said table at the right of said turret, and a cam 100 for a reciprocable, cut-off or saw head 101 which is on the table 70. The heads 97 and 99 respectively are reciprocable in ordinary ways 102—102 and 103—103 on the table 4, and the head 101 is mounted for lateral adjustment, by means of a screw 104, on a carriage 105, which latter is reciprocable on ways 106—106 on the table 70. The path of the carriage 105 is at right-angles to a path common to the heads 97 and 99. A pin 107 extends downward from the center of the base of the head 97, through a longitudinal slot 108 in the table 4, into the path of the cam 96, and a pin 109 extends downward from the center of the base of the head 99, through a longitudinal slot 110 in said table, into the path of the cam 98, such slots being long enough to accommodate themselves to the travel of said pins as they are moved by their respective cams and with their respective heads toward and away from the turret, it being understood that the offices of said cams is so to move said pins and heads. The table 4 is shown broken out in Fig. 4 to disclose the slot 110. The members 96 and 98 are peripheral cams, while the member 100 is a grooved cam with its groove 111 in the righ-hand side thereof, as shown in Fig. 11.

The carriage 105 under the head 101 is reciprocated by the cam 100 through the medium of a rock-shaft 112, which is parallel with the shaft 5, journaled in the sides of the frame under the table 70, and provided with a central, upwardly-directed rocker-arm 113, and with a downwardly-directed, segmental rocker-arm 114 at the left-hand end outside of an arm 115 loosely depending from said rock-shaft between said frame and said rocker-arm 114, connections between said last-named rocker-arm and said loose arm, and a horizontal, cam bar 116 mounted to reciprocate in supporting guides 117—117 fastened against the left-hand side of the frame extension on the outside—see more particularly Figs. 12, 14, 15, and 16.

The upper terminal of the rocker-arm 113 is bifurcated and has a block 118 pivoted thereto at 119. The front and back edges of the block 118 are parallel with each other and contact with the contiguous edges of pairs of lugs or brackets 120 secured to the underside of the carriage 105. The brackets 120 and the block 118 enables the rocker-arm 113 to operate and carry with it, without becoming disconnected from, the carriage 105, since said block moves up and down between said brackets, as said arm is rocked to actuate said carriage either forward or backward, but does not become disengaged therefrom. The inner edge portions of the brackets 120 with which the block 118 contacts are narrow enough to enter to the extent necessary the slot in the top of the rocker-arm 113 in which said block is located, as said rocker-arm is oscillated. The rocker-arm 113 has a part of its upper end broken away, in Fig. 16, to show the block 118 in full side elevation. A slot 121 is provided in the longitudinal center of the table 70 to receive and accommodate the brackets 120, such slot being of sufficient length to permit of the necessary forward and backward movement on the part of said brackets and the carriage 105.

The arm 115 is connected with the bar 116 by a somewhat similar connection as that employed between the rocker-arm 113 and the carriage 105, and for a similar reason. Here a rectangular block 122 is pivoted at 123 to the lower end of the arm 115, and said block is received in a recess 124 in the bar 116, such recess being longer than the vertical dimension of said block, but in width corresponding to the horizontal dimension of said block. As the arm 115 is oscillated by the bar 116, the block 122 works up and down in the recess 124, but has no horizontal movement independent of said bar. The arm 115 is outside of the bar 116 and operates between the guides 117.

The arm 115 extends down between a pair of lugs 125 on the inner face of the rocker-arm 114. Two bolts 126 are tapped into and through the lugs 125 and engage opposite edges of the arm 115. In this manner and by this means the rocker-arm 114 and the arm 115 are fastened together. When the bar 116 is actuated forward, said bar rocks the arm 115 and the rocker-arm 114, the rock-shaft 112, and the rocker-arm 113, in such a manner that the carriage 105 is moved rearwardly, and, when said bar is actuated rearwardly, it rocks the intervening members in such a manner that said carriage is moved forwardly. By adjusting the bolts 126 to throw the rocker-arm 114 forward relative to the arm 115, the carriage 105 will not be advanced so far, when the bar 116 is actuated rearwardly a given distance, and, by adjusting said bolts to throw said rocker-arm backward relative to said arm 115, said carriage will be advanced farther, when said bar is actuated rearwardly the same given distance.

A pin or follower 127 projects outwardly from the bar 116, at the front end, into the groove 111 in the cam 100, which cam operates said bar and the rocking members that actuate the carriage 105. At every revolution of the cam 100 the carriage 105 with the saw head 101 is caused to advance and recede.

The cam 96 is constructed to cause the chambering head 97 to advance and recede three times at each revolution of said cam, and to advance a little farther each time. But the cam 98 is constructed to cause the muzzle-finishing and oiler head 99 to advance and recede once only at each revolution of said cam. The heads 97, 99, and 101 are advanced simultaneously and retracted simultaneously by their respective cams, the retraction of the head 97 at this time, however being the third since this head was advanced the first time and the other heads were advanced. Next the machine is caused to index.

It will be observed that the dogs or cams 84 and 86 on the cam-wheel 71 are arranged in a certain peculiar manner thereon, there being two pairs of such cams with the cams in each pair quite close together, and two other cams quite far apart and associated with said two pairs. The purpose of this arrangement and the operation of the change-speed mechanism are explained as follows: The cam 84 at the bottom of the cam-wheel 71, as the latter is positioned in Fig. 6, is in practice the leading or first cam. This cam, when it reaches the pin 83, causes the belt 79 to be shifted from the pulley 73 to the pulley 74, with the result that the shaft 5 and the cams thereon are driven very slowly. By the time the three working heads have been advanced by their respective cams, the head 97 only part way and the other two heads all the way, the cam 86, which immediately follows the first cam 84 in the direction of rotation of the cam-wheel 71, causes the belt 85 to be shifted back onto the pulley 73 and the speed of the shaft 5 and the cams thereon accelerated. In consequence of this the cam 96 quickly actuates the head 97 to the left. The other cams on the shaft 5 do no work at this time. The head 97 being retracted quickly by reason of the accelerated speed of the operating parts, the second cam 84, which is the third cam following the first on the cam-wheel in the direction of rotation of said wheel, is placed quite close to the first cam 86, which is the second following cam on said wheel in said direction of rotation, and next acts to shift the belt again to produce the slow motion on the part of the shaft 5 and its cams. The head 97 is now slowly advanced the second time and a little farther than the first time, but the other heads are not affected. The fourth cam, which is the second cam 86, next comes into action and causes the speed of the shaft 5 to be once more accelerated, when the cam 96 retracts the head 97 the second time. Still the other heads are unaffected and remain so until the head 97 is retracted the third time, when said first-mentioned heads are retracted. The fifth cam, which is the third cam 84, is the next to come into action, quite soon following the fourth cam as the third cam followed the second, and to cause the speed to be cut down once more, so that the head 97, which is now caused to advance the third time and still farther than the second time, moves very slowly, as it did each time it advanced before. The sixth cam, which is the third cam 86, acts finally and causes the belt 85 to be shifted onto the pulley 73 and the speed of the parts to be accelerated in consequence thereof, as the heads are all actuated back into initial positions, and while the machine is indexing or one-seventh of a revolution is imparted to the turret. The space between the first and last cams, or the first cam 84 and the third cam 86, on the cam-wheel 71, and the dwells on and in the cams 96, 98, and 100 are sufficient to afford ample time for the indexing operation.

The head 97 has associated with the upstanding part at the forward end an upstanding tail-piece 128, and journaled in these two upstanding members and extending beyond the same are six horizontal spindles 129 for as many chambering tools 130. The tools 130 are affixed in ordinary chucks 131 at the forward ends of the spindles 129. The rear or left-hand terminals of the spindles 129 extend into a housing 132 which is fastened to the tail-piece 128 and in which is contained also the train of gears that drives said spindles—see Fig. 6. The upper rear spindle 129 is termed the first, the next below and in the rear the second, the next adjacent one the third, and so on, the upper front spindle being the sixth and last.

The aforesaid train of gears, in the housing 132, comprises large and small, intermediate gears 133 and 134, respectively, loosely mounted on a stud 135 projecting from the tail-piece 128, at a point which is the center of a circle passing through the axes of the spindles 129, into said housing, said gears being secured the one to the other; a large gear 136 secured on the last spindle 129 and intermeshing with said small, intermediate gear 134; and a small gear 137 secured on each of the five remaining spindles 129 and intermeshing with said large, intermediate gear 133. The gear 137 on the second spindle 129 intermeshes also with a spiral gear 138 secured on the adjacent terminal portion of the shaft 20. Thus the shaft 20, through the medium of the spiral gear 138 and the gear 137 that intermeshes therewith, the intermediate gears 133 and 134, and the other four gears 137 and the gear 136, drives the spindles 129. The spindles 129 are all driven in the same direction and, with the exception of the last of said spindles, at the same speed. The first spindle 129 carries the roughing tool or reamer that makes the initial chambering cut, while the last spindle 129 carries the reamer that finally finishes the chamber, and, since it is desired to run said last-named reamer more slowly than the others, the small, intermediate gear 134 and the large gear 136 are provided for that purpose.

The spiral gear 138 is of sufficient length to enable the head 97 to be reciprocated to the full extent without the gear 137, on the fifth spindle 129, becoming disengaged from said first-named gear.

The axial centers of six of the turret stations, or all but the top or receiving station of the turret, are in line with the axes of the spindles 129, except when the machine is indexing, and the same thing is true with regard to the axial centers of said stations relative to the fixed axes of the parts which operate in conjunction with the turret at the right-hand end thereof, or in conjunction with said stations at such end. The parts last referred to comprise three oilers, and two combined muzzle-finishing and oiler elements.

The six reamers 130 are graded from roughing to finishing, as previously intimated, and they are moved into and out of active position three times, a little farther forward each time until the full depth is reached at the third advance, in order that the bores shall be kept free from chips and the work properly done. The means by which and the manner in which the reamers 130 are actuated into active position and withdrawn from such position have already been fully described and explained.

Passing now to the saw head 101, and referring, particularly to Figs. 1, 12, and 14, it will seem that such head has at the forward end two bearings 141 in which the spindle 139 and a driving shaft 142 are journaled, said shaft being behind said spindle. The shaft 142 has a pulley 143 secured thereon and driven by a belt (not shown), such pulley being in the center of said shaft. The shaft 142 and the spindle 139 are transversely positioned relative to the head 101, and there are intermeshing spiral gears 144 and 145 respectively secured on the right-hand terminals of said shaft and spindle, outside of the right-hand bearing 141, the gear 144 being smaller than the gear 145. The spindle 139 projects to the left beyond the left-hand bearing 141, and the saw 140 is secured on such projecting terminal of said spindle, in position to cut off the muzzle end of a gun barrel 28 in the first operative turret station, that is, the station which is immediately adjacent to the top or receiving station of the turret on the back side, when the head 101 is advanced, by the means and in the manner previously set forth. The saw is driven from the pulley 143, through the medium of the shaft 142, spiral gears 144 and 145, and spindle 139. The cutting-off operation is performed while the reamers 130 are doing their work at the breech ends of the barrels 28, and at the same time other work is being performed on the muzzle ends of two of the barrels, as will subsequently be made plain.

Next in order the head 99 with its finishing tools and oilers will be considered. In this connection see Figs. 1, 4, 5, 12, and 13. Journaled in the upstanding part of the head 99 and a tail-piece bearing 146, with which said head is provided, just above the base of said head, are two horizontal spindles 147. The spindles 147 project at each end beyond the bearing therefor at such end, and each has an oil passage extending through the entire length thereof, such passage being indicated by dotted lines 148 in Fig. 4. Secured on the right-hand, protruding terminals of the spindles 147 are two spiral gears 149, and secured on the left-hand, protruding terminals of said spindle are two muzzle-finishing tools 150, the front one of said tools being for the purpose of roughing off the muzzle after the barrel has been cut to length by the saw 140, and the other tool being for the purpose of finally finishing such muzzle. There is a centering projection 151 at the forward end of each spindle 147, to enter the contiguous barrel 28, as usual, and the oil passage 148 in said spindle extends through said projection. A spiral gear 152, secured on the shaft 20 adjacent to the right-hand end thereof, drives the spindles 147 both in the same direction, through the medium of an intermediate gear 153, the back gear 149, an intermediate gear 154, and the front gear 149, said first-named intermediate gear intermeshing with said spiral gear and said back gear, and said second-named intermediate gear intermeshing with said back and front gears—see Fig. 13. The intermediate gear 153 is loosely mounted on a horizontal stud 155 set in a lug 156 on the back of the bearing 146. The intermediate gear 154 is loosely mounted on a horizontal stud 157 set in the outer end of the base of the head 99.

Three independent oilers are carried by the head 99, two of such oilers being in front and the third behind. Upon referring more particularly to Fig. 5, it will be seen that each of these oilers comprises a horizontal outer tube 158 fixed in the head 99, a screw plug 159 at the right-hand or rear end of such tube, such plug having a longitudinal passage 160 therethrough, a hollow plunger 161 in said tube and projecting out of the left-hand or front end thereof, a spring 162 in said tube between adjacent ends of said plug and plunger, and a small, inner tube 163 which extends from the passage 160 nearly to the front end of said plunger. The tube 163 is shown in elevation, and said tube is secured rigidly to the plunger 161. The plunger 161 has a sliding fit in an enlarged portion 166 of the passage through the tube 158, and the tube 163 has a sliding fit in the passage 160. A screw 164, tapped into and through the side of the tube 158 near the forward end thereof, enters a longitudinal groove 165 in the side of the plunger 161 adjacent to the forward end of said plunger and allows a certain amount of independent longitudinal movement on the part of said plunger to take place, but at the same time prevents the plunger from being forced, by the spring 162, too far out of said tube. An oil-way, made up of the cap 159, tube 163, and plunger 161, is formed through the oiler from end to end; and, in the spring-pressed plunger 161, said oiler is provided with yielding means whereby the oiler may be forced tightly against the muzzle of a gun barrel, without danger of breakage or undue shock, on the one hand, or liability of falling short of such muzzle, on the other hand, provided the forward travel of the head 99 be calculated with reasonable accuracy. In other words, the presence of the yielding plunger 161 insures a good and firm contact with the barrel muzzle, and this regardless of whatever variation there may or might be in the projection of such muzzle.

The saw 140, when in active position, is opposite to the first reamer 130, the rear oiler is opposite to the second reamer 130, the finishing tools 150 are opposite to the third and fourth reamers 130, respectively, the lower front oiler is opposite to the fifth reamer, and the upper front oiler is opposite to the sixth and last reamer. As has been stated, the saw is advanced to cutting-off position and the oilers and finishing tools are actuated into contact with the muzzle ends of contiguous barrels 28 at the same time the reamers 130 are actuated into contact with the breech ends of said barrels for the initial boring operation, and said saw, oilers and finishing tools are withdrawn from operative positions simultaneously and at the time said reamers are withdrawn the third time.

Taking up lastly the means whereby oil is furnished to the spindles 147 and the oilers which comprise the tubes 158, and the mechanism for automatically controlling the oil supply, attention is first called to Figs. 1, 6, 8, and 9, wherein an oil pump is represented at 167, with a pipe 168 leading therefrom to an oil tank or reservoir (not shown), and another pipe 169 leading therefrom to a valve-casing 170 which is fastened against the left-hand side of the rearward extension of the frame 3, as shown in Fig. 14. A pipe 171 leads from the valve-casing 170 through the interior of the frame 3 to a distributing head 172 located at the top of the machine at the right-hand end, and another pipe, indicated at 173 in Figs. 2, 3, and 14, leads from said valve-casing to the aforesaid tank or reservoir. Flexible pipes 174 connect the distributing head 172 with the two spindles 147 and the three caps 159. The pipes 174 are of sufficient length to permit the spindles and oilers carried by the head 99 to be reciprocated without disturbing the connections between said spindles and oilers and said pipes. Ordinary flexible connections are employed between the spindles 147 and the pipes 174 attached thereto, so as to enable said spindles to revolve. The point of connection between the pipe 171 and the distributing head 172 is indicated at 175 in Fig. 1. A branch pipe 176, from the pipe 171, is carried upward and forward into position to supply the saw 140 with oil when the latter is in active position. The head 172 is equipped with valves 177 with which to control the passage of oil into the several pipes 174.

The oil pump 167 is supported by a bracket 178 attached to the back side of the frame 3, and said pump has a driving shaft 179 with a pulley 180 secured thereon. The belt for driving the pulley 180 is omitted.

The pump 167 forces the oil, which it receives by way of the pipe 168, through the pipe 169, the valve-casing 170, and either the pipe 171 or the pipe 173, accordingly as a valve 181 in said casing is disposed. The oil thus forced through the pipe 171 enters the branch pipe 171 to lubricate the saw 140, and enters the head 172 and pipe 175, and is distributed to the several pipes 174, provided the valves 177 be open. From the pipes 174 the oil is discharged through the two spindles 147 and the three associated oilers which include the tubes 158, and into five of the gun barrels, when the head 99 is at the forward end of its travel, with the centering projections 151 in two of said barrels, the two in the bottom stations of the turret, and the plungers 161 in forcible contact with three of said barrels that occupy the second, fifth, and sixth turret stations, not counting the receiving station at the top of the turret. The oil thus forced into and through five of the barrels 28, or all of the barrels which are being operated on except the first, clears them of chips each time the reamers 130 are withdrawn, and lubricates the reamers which are chambering said five barrels, and the finishing tools 150 as well. The reamer 130, which performs the initial chambering operation in the breech of the barrel 28 at the first turret station, is lubricated directly in the ordinary manner, so also are the other reamers for that matter, but the latter receive additional lubrication by way of the gun barrels as just explained.

As illustrated in Fig. 2, the valve 181 is of the three-way variety, and admits oil from the pipe 169 at one port in the valve-casing 170, and discharges it through either of two other ports in said casing into either the pipe 171 or the pipe 173, while closing the remaining port, according to the position of said valve. In Fig. 2, the valve 181 is disposed so as to close the way to the pipe 173 and open the way to the pipe 171, but when said valve is rotated the proper distance, in the direction of the arrow borne by said valve, the way to said pipe 171 is closed and that to said pipe 173 opened. In the first instance the oil passing through the valve-casing and valve reaches the saw and the oiler members carried by the head 99, but in the second instance the oil is diverted by said valve from the pipe 171 to the pipe 173 and so returns to the tank or reservoir.

The supply of oil to the saw, reamers, etc., is needed only while said members are in operation, and should be cut off during the time that said members are inactive, in order to prevent useless discharge of oil at the several discharge points in the reaming, sawing, and grinding mechanisms and splashing which would be very objectionable. And it is for this reason that the valve 181 is provided, together with operating means or mechanism for said valve whereby the latter is made subject to control by one of the sliding heads, the saw head 101 or the carriage 105 under said head in the present instance. The aforesaid mechanism comprises a horizontal rack 182 on the bottom edge of an angular bracket 183, which latter is rigidly attached to the left-hand side of the carriage 105, above the valve-casing 170. The rack 182 is parallel with the adjacent side of the frame extension, and at right-angles to a stem 184 that projects to the left from the valve 181, through the corresponding side of the valve-casing 170, and beneath said rack. A pinion 185 is secured on the valve stem 184 in intermeshing relation with the rack 182.

When the carriage 105 is moved forward, the valve 181 is actuated in one direction, through the medium of the rack 182, pinion 185, and valve-stem 184, and when said carriage is moved rearwardly, said valve is actuated in the opposite direction, through the same medium as before. The relative arrangement of the parts is such that the valve 181 is disposed to close the entrance to the pipe 171 and open that to the pipe 173, when the carriage 105 is at the rear end of its travel, thus cutting off the flow of oil to the reaming, sawing, and muzzle-rounding members; and that said valve is disposed to close the entrance to said pipe 173 and open that to said pipe 171, when said carriage is at the forward end of its travel, thus admitting a free flow of oil to said members.

Having in detail described the construction of the machine and explained the operation of the several elements thereof by themselves, I will briefly explain the operation of the machine as a whole.

Assuming that a gun barrel 28 is in each of the seven turret stations, and that the machine has indexed, the first operation, which is collective, is the advance toward the turret of the heads 97 and 99, impelled by the cams 96 and 98, the advance of the head 101 toward the longitudinal, vertical, central plane of the machine, impelled by the cam 100, and the partial rotation of the valve 181 to admit the oil to the pipe 171 and close the pipe 173, such rotation of said valve being brought about by the carriage 105 which supports said head 101. The reamers 130, which revolve constantly, now make their cuts in the breech ends of all of the barrels 28 except that in the top or receiving station of the turret, making such cuts intermittently and progressively in the three reciprocable movements imparted by the cam 96. The first reamer roughs out the chamber in the first barrel, the second reamer makes the second cut in the chamber of the second barrel, the third reamer the third cut in the third barrel, and so on, the sixth reamer finishing the chamber in the sixth barrel. While the reamers 130 are doing their work, the saw 140 cuts off the first barrel at the muzzle end, and the muzzle-finishing tools 150 act on the cut ends of the third and fourth barrels to round off such ends smoothly, the fifth and sixth barrels already having had their muzzles finished by said tools. The saw 140 and tools 150 also revolve constantly. Meanwhile oil is being pumped into and through all of the barrels except the first, and, of course, the one at the receiving station. At the end of these several operations, the three heads are withdrawn from operative positions, the oil is directed into the pipe 173, and the machine is caused to index, the turret being given one-seventh of a revolution, by the action of the cam 38 and the other indexing elements on the shaft 6. After the machine indexes and during the interval between indexing, the operator unclamps and removes the barrel at the receiving station, which barrel a moment ago was the sixth and has just been completely finished at both ends so far as this machine is concerned, and inserts and clamps in place at such station a new barrel which remains there until the machine again indexes. The barrel formerly at the receiving station is now at the first station in position ready to receive the first reamer and to be cut to length, upon the next advance of the heads 97 and 101. At every cycle of the machine, therefore, a barrel is finished and taken out and another put in its place. A fresh barrel is delivered to first operative position each time the machine indexes, a barrel is finished at every fifth indexing of the machine after that which carries said barrel to first operative position, or at every sixth indexing, and a finished barrel is advanced to delivery position (the receiving station) each time said machine indexes, so long as the supply of barrels is maintained.

In loading the turret initially, a barrel is placed in the receiving station at the start, and then one after each indexing, none being found for delivery at said station until after the seventh barrel has been placed therein.

The used and surplus oil fed to the machine, together with the chips and particles removed by the tools from the barrels, finds its way to the channel 2 provided in the base 1 to receive the same.

Although this machine is designed for chambering, cutting off, and finishing the muzzle ends of gun barrels, it is conceivable that it might be used for other purposes.

The purpose of providing the speed-change mechanism is, of course, to obtain a quick return of the reamers and to index at a high rate of speed, so that the triple reaming operation can be performed in the time available for such operation. This change in speed of the cam shaft 5 does not interfere with the proper operations of the saw or of the members carried by the head 99.

The term "chamber" with its derivatives as herein used is to be understood as including any drilling, reaming, counterboring, or similar operation.

What I claim as my invention, and desire to secure by Letters Patent, is—

1. A machine, of the class described, comprising means to hold at the ends a plurality of tubular objects by their ends, means to chamber such objects at one end, and means to cut off such objects at the other end.

2. A machine, of the class described, comprising means to hold at the ends a plurality of tubular objects by their ends, means to chamber such objects at one end, and means to finish exteriorly such objects at the other end.

3. A machine, of the class described, comprising means to hold at the ends a plurality of tubular objects by their ends, means to chamber such objects at one end, means to cut off such objects at the other end, and means to finish exteriorly such objects at said last-named end.

4. A machine, of the class described, comprising means to hold at the ends a plurality of tubular objects by their ends, means to cut off such objects at one end, and means to finish exteriorly such objects at the same end.

5. A machine, of the class described, comprising means to hold at the ends a plurality of tubular objects by their ends, means to chamber such objects at one end, and means to inject a lubricant into such objects at the other end.

6. A machine, of the class described, comprising means to hold at the ends a plurality of tubular objects by their ends, means to chamber such objects at one end, means to finish exteriorly such objects at the other end, and means to inject a lubricant into such objects at said last-named end.

7. A machine, of the class described, comprising means to hold at the ends a plurality of tubular objects by their ends, progressively-operated means simultaneously to chamber such objects at one end, and means to cut off such objects successively at the other end.

8. A machine, of the class described, comprising means to hold at the ends a plurality of tubular objects by their ends, progressively-operated means simultaneously to chamber such objects at one end, and means to finish exteriorly such objects successively at the other end.

9. A machine, of the class described, comprising means to hold at the ends a plurality of tubular objects by their ends, progressively-operated means simultaneously to chamber such objects at one end, and means to inject a lubricant into such objects at the other end.

10. A machine, of the class described, comprising means to hold at the ends a plurality of tubular objects by their ends, progressively-operated means simultaneously to chamber such objects at one end, and means to inject a lubricant into such objects successively at the other end.

11. A machine, of the class described, comprising means to hold at the ends a plurality of tubular objects by their ends, progressively-operated means simultaneously to chamber such objects at one end, means to cut off such objects successively at the other end, and means to finish exteriorly such objects successively at said last-named end.

12. A machine, of the class described, comprising means to hold at the ends a plurality of tubular objects by their ends, progressively-operated means simultaneously to chamber such objects successively at one end, means to finish exteriorly such objects successively at the other end, and means to inject a lubricant into such objects successively at said last-mentioned end.

13. A machine, of the class described, comprising progressive means to hold at the ends a plurality of tubular objects by their ends, and progressively-operated means simultaneously to chamber such objects.

14. A machine, of the class described, comprising progressive means to hold at the ends a plurality of tubular objects by their ends, progressively-operated means simultaneously to chamber such objects at one end, and means to cut off such objects at the other end.

15. A machine, of the class described, comprising progressive means to hold at the ends a plurality of tubular objects by their ends, progressively-operated means simultaneously to chamber such objects at one end, and means to finish exteriorly such objects at the other end.

16. A machine, of the class described, comprising progressive means to hold at the ends a plurality of tubular objects by their ends, progressively-operated means simultaneously to chamber such objects at one end, and means to inject a lubricant into such objects at the other end.

17. In a machine of the class described, progressively-operated means simultaneously to chamber at one end a plurality of tubular objects, and means to inject a lubricant into such objects at the other end.

18. In a machine of the class described, means simultaneously to chamber at one end a plurality of tubular objects, and means to cut off, means to finish, and means to lubricate said objects at the other end.

19. In a machine of the class described, progressively-operated means simultaneously to chamber at an end a plurality of tubular objects, and means to cut off, means to finish, and means to lubricate such objects at the other end.

20. In a machine of the class specified, an intermittently-rotative turret having heads adapted to hold and carry a plurality of gun barrels by their ends, a reciprocating chambering head at one end of said turret, and a reciprocating cutting-off head arranged to travel in a path at right-angles to that of said first-named head and adjacent to the opposite end of said turret.

21. In a machine of the class described, an intermittently-rotating turret having heads adapted to hold and carry a plurality of gun barrels by their ends, a reciprocating chambering head at one end of said turret, and a reciprocating head equipped with muzzle-finishing tools, at the opposite end of said turret.

22. In a machine of the class described, an intermittently-rotating turret adapted to carry a plurality of gun barrels, a reciprocating chambering head at one end of said turret, and a reciprocating oiler head at the opposite end of said head.

23. In a machine of the class described, an intermittently-rotating turret adapted to carry a plurality of gun barrels, a reciprocating chambering head at one end of said turret, and a combined muzzle-finishing-tool and oiler head at the opposite end of said turret.

24. In a machine of the class described, an intermittently-rotating turret having heads adapted to hold and carry a plurality of gun barrels by their ends, a reciprocating chambering head at one end of said turret, a reciprocating head equipped with muzzle-finishing tools, at the opposite end of said turret, and a reciprocating cutting-off head arranged to travel in a path at right-angles to that of said two first-named heads and adjacent to said last-named end of said turret.

25. In a machine of the class described, an intermittently-rotating turret having heads arranged to afford a plurality of stations for holding gun barrels at both ends, and means to operate on gun barrels at said stations, at both ends of such barrels.

26. In a machine of the class described, an intermittently-rotating turret having heads arranged to afford a plurality of stations, including a receiving station, for holding gun barrels at both ends, and means to operate on gun barrels carried by said turret, at both ends of such barrels.

27. In a machine of the class described, a rotatable turret comprising a head perforated to receive a plurality of gun barrels at one end, and a head recessed to receive the barrels at the other end, and provided with means to clamp such barrels to one of said heads.

28. In a machine of the class described, a rotatable turret comprising a head perforated to receive the breech ends of a plurality of gun barrels, and a head recessed to receive the muzzle ends of such barrels, said last-named head being provided with latches, bolts and nuts to clamp said barrels in place.

29. In a machine of the class described, a turret having heads for a plurality of gun barrels, the latter being held by their ends in said heads, means to operate at the breech ends of certain of the barrels carried by said turret, means to operate at the muzzle ends of certain of said barrels, means to actuate said operating means into and out of operative positions, and means partially to rotate said turret during the time that said operating means are out of said operative positions.

30. The combination, in a machine of the class described, with a shaft, and a cam on said shaft, of a second shaft, turret heads, for a plurality of gun barrels, on said second shaft, a disk loosely mounted on said second shaft, a ratchet-wheel secured on said second shaft, a lever pivotally attached to said disk at a point remote from the disk axis, and provided with a pawl which is in engagement with said ratchet-wheel, and a lever pivotally connected with said first-named lever and arranged to be operated by said cam.

31. The combination, in a machine of the class described, with a shaft, and a cam on said shaft, of a second shaft, turret heads, for a plurality of gun barrels, on said second shaft, a disk loosely mounted on said second shaft, a ratchet wheel secured on said second shaft, a lever pivotally attached to said disk, and provided with a pawl which is in engagement with said ratchet-wheel, a lever pivotally connected with said first-named lever and arranged to be operated by said cam, and locking and releasing means for said second shaft, and controlling means carried by said disk for said first-named means.

32. The combination, in a machine of the class described, with a shaft, and a cam on said shaft, of a second shaft, turret heads, for a plurality of gun barrels, on said second shaft, a notched lock-plate and a ratchet-wheel secured on said second shaft, a disk loosely mounted on said second shaft and provided with a latch head, a spring-pressed bolt normally in engagement with a notched part of said lock-plate, and provided with a projecting member to be engaged by said latch head, a lever pivotally attached to said disk, a pawl carried by said lever in engagement with said ratchet-wheel, a movable dog carried by said disk, said projecting member being in the path of said dog, and a lever pivotally connected with said first-named lever and arranged to be operated by said cam.

33. The combination, in a machine of the class described, with a turret for gun barrels, said turret having heads for the breech and muzzle ends of said barrels, of a reciprocating head, tool spindles journaled in said head and being simultaneously reciprocated therewith, a train of gears carried by said head to drive said spindles, and a shaft provided with a driving member for said train of gears, said driving member being approximately equal in length to the travel of said head.

34. The combination, in a machine of the class described, with a turret for gun barrels, said turret having heads for the breech and muzzle ends of said barrels, of heads mounted to reciprocate at both ends of said turret, tool spindles carried by and simultaneously reciprocated with each of said heads, a train of gears carried by each of said heads to drive said spindles journaled therein, and a shaft provided with driving members for said trains of gears, each of said driving members being approximately equal in length to the travel of the corresponding head.

35. The combination, in a machine of the class described, with a turret for gun barrels, of a head adapted to be reciprocated adjacent to one end of said turret, a hollow revoluble tool-carrying spindle journaled in said head and adapted for open contact with a gun barrel carried by said turret, and means to inject oil into said spindle.

36. The combination, in a machine of the class described, with a turret for gun barrels, of a head adapted to be reciprocated adjacent to one end of said turret, oilers mounted in said head and adapted for open contact with gun barrels carried by said turret, and means to inject oil into such oilers.

37. The combination, in a machine of the class described, with a turret for gun barrels, of a head adapted to be reciprocated adjacent to one end of said turret, an oiler, having a yielding forward terminal, mounted in said head and adapted for forcible open contact with a gun barrel carried by said turret, and means to inject oil into said oiler.

38. The combination, in a machine of the class described, with a turret for gun barrels, of a head adapted to be reciprocated adjacent to one end of said turret, hollow revoluble tool-carrying spindles journaled in said head and adapted for open contact with gun barrels carried by said turret, oilers mounted in said head and adapted for simultaneous open contact with gun barrels carried by said turret, and means to inject oil into said spindles and oilers.

39. In a machine of the class described, a turret for gun barrels, a reciprocating chambering head, means to inject oil into the muzzle ends of gun barrels carried by said turret, and automatic means to regulate the supply of oil according to the position of said head.

40. In a machine, of the class described, a turret for gun barrels, reciprocating chambering, cutting-off, and combined muzzle-finishing and oiler heads, means to reciprocate said heads, and oil-supply means under the control of said first-named means.

41. In a machine, of the class described, a turret for gun barrels, reciprocating chambering, cutting-off, and combined muzzle-finishing and oiler heads, means to supply oil to the oiler member carried by the combined muzzle-finishing and oiler head, and automatic means to let on the oil when said heads arrive in operative positions, and to shut off the oil when said heads leave such positions.

42. The combination, in a machine of the class described, with a turret for gun barrels, a chambering head, a cutting-off head and carriage provided with a rack, a combined muzzle-finishing and oiler head, and means to reciprocate said heads and carriage, of a valve-casing and valve, said valve having a stem, a gear on said stem intermeshing with said rack, an oil-supply pipe leading to said valve-casing, a pipe leading from said casing, and tubular connections between said last-named pipe and the oiler members carried by said last-named head, the construction and arrangement of parts being such that the oil is shut off when said carriage is actuated in one direction, and let on when said carriage is actuated in the opposite direction.

43. In a machine of the class described, an indexing turret having receiving and working stations for gun barrels, a progressively-advanced reciprocable head equipped with tools to chamber the breech ends of gun barrels carried by said turret in said working stations, a reciprocable head equipped with a saw to cut off the muzzle-end of the gun barrel in the first working station, and a reciprocable head equipped with tools to finish the cut ends of said barrels, the construction and arrangement of parts being such that said barrel in said first station is completely chambered and muzzle-finished when said turret indexes to carry said barrel from the sixth working station to said receiving station.

44. In a machine of the class described, means for progressively boring out the chambers in a plurality of gun barrels, and means for progressively cutting off said barrels at their muzzle ends.

45. In a machine of the class described, means for progressively boring out the chambers in a plurality of gun barrels, and means for progressively finishing the muzzle ends of such barrels.

46. In a machine of the class described, means for progressively cutting off the muzzle ends of a plurality of gun barrels, and means for progressively finishing the cut ends of said barrels.

47. In a machine of the class described, means for progressively boring out the chambers in a plurality of gun barrels, means for progressively cutting off said barrels at their muzzle ends, and means for progressively finishing said ends.

48. In a machine of the class described, means for progressively boring out the chambers in a plurality of gun barrels, and means for progressively injecting oil into said barrels at said ends.

49. In a machine of the class described, means for progressively boring out the chambers in a plurality of gun barrels, means for progressively finishing the muzzle ends of said barrels, and means for progressively injecting oil into said barrels at said ends.

50. The combination, in a machine of the class described, with a turret for gun barrels, of a head adapted to be reciprocated adjacent to one end of said turret, a hollow revoluble tool-spindle journaled in said head and adapted for open contact with a gun barrel carried by said turret, an oiler, having a yielding forward terminal, also mounted in said head and adapted for forcible open contact with another gun barrel carried by said turret, and means to inject oil into said spindle and oiler.

51. In a machine of the class described, intermittently-rotative means to hold a plurality of tubular objects, reciprocable means to bore objects held by said first-named means, and means to expel from said objects the chips made by said boring means, after the latter has been withdrawn from said objects and before said first-named means is caused to operate.

52. In a machine of the class described, intermittently-rotative means to hold a plurality of tubular objects, reciprocable means to bore at one end objects held by said first-named means, and means to inject a lubricant into said objects at the other end to expel the chips made by said boring means, after the latter has been withdrawn from said objects and before said first-named means is caused to operate.

EDWARD H. INGRAM.

Witnesses:
F. A. CUTTER,
A. C. FAIRBANKS.

Copies of this patent may be obtained for five cents each, by addressing the "Commissioner of Patents, Washington, D. C."